United States Patent
Liu

(10) Patent No.: US 9,830,817 B2
(45) Date of Patent: Nov. 28, 2017

(54) BUS STATION OPTIMIZATION EVALUATION METHOD AND SYSTEM

(71) Applicant: ZTE CORPORATION, Shenzhen, Guangdong Province (CN)

(72) Inventor: Shuxia Liu, Shenzhen (CN)

(73) Assignee: XI'AN ZHONGXING NEW SOFTWARE CO., LTD., Xi'An, Shaanxi (CN)

( * ) Notice: Subject to any disclaimer, the term of this patent is extended or adjusted under 35 U.S.C. 154(b) by 0 days.

(21) Appl. No.: 15/107,099

(22) PCT Filed: May 27, 2014

(86) PCT No.: PCT/CN2014/078483
§ 371 (c)(1),
(2) Date: Jun. 21, 2016

(87) PCT Pub. No.: WO2015/096379
PCT Pub. Date: Jul. 2, 2015

(65) Prior Publication Data
US 2016/0335894 A1    Nov. 17, 2016

(30) Foreign Application Priority Data

Dec. 25, 2013 (CN) .......................... 2013 1 0726589

(51) Int. Cl.
*G08G 1/123*    (2006.01)
*G01S 19/42*    (2010.01)
(Continued)

(52) U.S. Cl.
CPC ............ *G08G 1/123* (2013.01); *G01S 19/42* (2013.01); *G01S 19/52* (2013.01); *G06Q 10/04* (2013.01);
(Continued)

(58) Field of Classification Search
None
See application file for complete search history.

(56) References Cited

U.S. PATENT DOCUMENTS

2003/0137435 A1 *  7/2003  Haddad .................. G08G 1/133
                                                      340/994
2006/0074545 A1    4/2006  Kim
(Continued)

FOREIGN PATENT DOCUMENTS

CN       201435147 Y     3/2010
CN       102013163 A     4/2011
(Continued)

OTHER PUBLICATIONS

Li, Yingshuai et al. Bus Station Optimization Method Based on the Principle of station Canceling and Station Combining, Journal of Chongqing Jiaotong University. Dec. 31, 2011.
(Continued)

*Primary Examiner* — Joseph Feild
*Assistant Examiner* — John Mortell
(74) *Attorney, Agent, or Firm* — Ling Wu; Stephen Yang; Ling and Yang Intellectual Property

(57) ABSTRACT

A method and a system for optimizing and evaluating a bus station is disclosed, wherein the method includes: acquiring bus map information and information of moving trajectories of bus users; acquiring human flow moving trajectory dispersion information of the bus users after they leave the bus station according to the bus map information and the information of the moving trajectories of the bus users; and optimizing and evaluating the bus station according to the human flow moving trajectory dispersion information of the bus users. The above technical scheme can accurately perform statistics on passenger flow data related to the bus station, thereby optimizing and evaluating the bus station.

8 Claims, 3 Drawing Sheets

(51) Int. Cl.
*G06Q 10/00* (2012.01)
*G01S 19/52* (2010.01)
*H04W 4/02* (2009.01)
*G06Q 10/04* (2012.01)
*G06Q 50/30* (2012.01)
*G08G 1/00* (2006.01)

(52) U.S. Cl.
CPC ............... *G06Q 50/30* (2013.01); *G08G 1/20* (2013.01); *H04W 4/027* (2013.01); *H04W 4/028* (2013.01)

(56) References Cited

U.S. PATENT DOCUMENTS

2012/0310707 A1* 12/2012 Naphade ........... G06F 17/30241
  705/7.31

2013/0024114 A1    1/2013  Oriet

FOREIGN PATENT DOCUMENTS

| CN | 102156908 A | 8/2011 |
| CN | 102332210 A | 1/2012 |
| CN | 103325257 A | 9/2013 |
| JP | 2010014592 A | 1/2010 |
| KR | 20130004398 A | 1/2013 |

OTHER PUBLICATIONS

Automatic Bus Routing and Passenger Geocoding with a Geographic Information System; Yue hong Chou, Department of Earth Sciences University of California Riverside, CA 92521 USA; XP000641168; Jul. 30, 1995.

* cited by examiner

BUS STATION OPTIMIZATION EVALUATION METHOD AND SYSTEM

TECHNICAL FIELD

The present document relates to the technology of optimizing and evaluating a bus station, and in particular, to a method and system for optimizing and evaluating a bus station.

BACKGROUND OF THE RELATED ART

With the continuous expansion of city scale and the continuous growth of population size, the population distribution changes and road conditions continuously improve. However, bus routes normally cannot satisfy citizens' trip demand, but how to adjust the bus routes need to be supported by predicted data of a passenger flow volume and passenger flow distribution. Currently, a common practice is to acquire OD prediction of an urban passenger flow by performing questionnaire survey for residents. Passenger flow statistics for bus IC cards can only be used to acquire actual data of resident trips, but cannot reflect actual trip wiliness of residents.

SUMMARY

The technical problem to be solved by the embodiments of the present document is to provide a method and system for optimizing and evaluating a bus station, to accurately perform statistics on passenger flow data related to the bus station and then optimize and evaluate the bus station.

In order to solve the above technical problem, the following technical solutions are used by the present document.

A method for optimizing and evaluating a bus station comprises:

determining bus users from mobile terminal users;

tracking moving trajectories of the bus users after leaving the bus station, and acquiring human flow moving information of the bus station according to the acquired moving trajectories and a bus map; and optimizing and evaluating the bus station according to the human flow moving information.

Alternatively, the step of determining bus users from mobile terminal users comprises:

acquiring information of a moving speed and a trajectory of a bus as well as information of moving speeds and trajectories of the mobile terminal users; and determining the bus users from the moving terminal users by comparing the information of the moving speed and the trajectory of the bus with the information of the moving speeds and the trajectories of the mobile terminal users.

Alternatively, the step of acquiring information of a moving speed and a trajectory of a bus comprises: acquiring the information of the moving speed and the trajectory of the bus through a Global Positioning System (GPS) carried by the bus; and the step of acquiring information of moving speeds and trajectories of the mobile terminal users comprises: acquiring the information of the moving speeds and the trajectories of the mobile terminal users through GPSs of mobile terminals or through communication signaling information of the mobile terminal users.

Alternatively, the step of acquiring the information of the moving speeds and the trajectories of the mobile terminal users through communication signaling information of the mobile terminal users comprises:

acquiring position update information of the mobile terminal users and base station cell information; and acquiring the information of the moving speeds and the trajectories of the mobile terminal users according to the position update information of the mobile terminal users and the base station cell information.

Alternatively, the human flow moving information comprises a human flow moving direction and human flow moving intensity.

A system for optimizing and evaluating a bus station comprises a bus user determination module, a human flow moving information acquisition module and an optimization and evaluation module, wherein, the bus user determination module is configured to determine bus users from mobile terminal users;

the human flow moving information acquisition module is configured to track moving trajectories of the bus users after leaving the bus station, and acquiring human flow moving information of the bus station according to the acquired moving trajectories and a bus map; and the optimization and evaluation module is configured to optimize and evaluate the bus station according to the human flow moving information.

Alternatively, the system further comprises an information collection module, wherein, the information collection module is configured to acquire information of a moving speed and a trajectory of a bus as well as information of moving speeds and trajectories of the mobile terminal users; and the bus user determination module is configured to determine the bus users from the moving terminal users by comparing the information of the moving speed and the trajectory of the bus with the information of moving speeds and the trajectories of the mobile terminal users which are collected by the information collection module.

Alternatively, the information collection module is configured to acquire information of a moving speed and a trajectory of the bus by means of acquiring the information of the moving speed and the trajectory of the bus through a Global Positioning System (GPS) carried by the bus; and the information collection module is configured to acquire information of moving speeds and trajectories of the mobile terminal users by means of acquiring the information of the moving speeds and the trajectories of the mobile terminal users through GPSs of mobile terminals or through communication signaling information of the mobile terminal users.

Alternatively, the information collection module is configured to acquire the information of the moving speeds and the trajectories of the mobile terminal users through communication signaling information of the mobile terminal users by means of:

acquiring position update information of the mobile terminal users and base station cell information; and acquiring the information of the moving speeds and the trajectories of the mobile terminal users according to the position update information of the mobile terminal users and the base station cell information.

Alternatively, the human flow moving information comprises a human flow moving direction and human flow moving intensity.

The above technical solutions can accurately perform statistics on passenger flow data related to a bus station, thereby optimizing and evaluating the bus station.

PREFERRED EMBODIMENTS

Currently, the popularity rate of mobile phones is greatly increased. In most provinces and cities, the popularity rate is up to 80 mobile phones per hundred people or more. It is predicted that the popularity rate of mobile phones in China will achieve and exceed 100 mobile phones per hundred people by 2015. Statistics of human flow rate, human flow directions, and residence time can be acquired in time by using the big data mining technology of mobile signaling data, and can be used as basis data for planning and evaluating an urban comprehensive transportation system, thereby reducing the investment of manpower and material resources in OD investigation of the urban passenger flow, and achieving a low cost and high accuracy.

The specific embodiments of the present document will be described in detail below in conjunction with accompanying drawings. However, these embodiments are not intended to limit the present document.

Method Embodiments

Embodiment One

Figure 1:
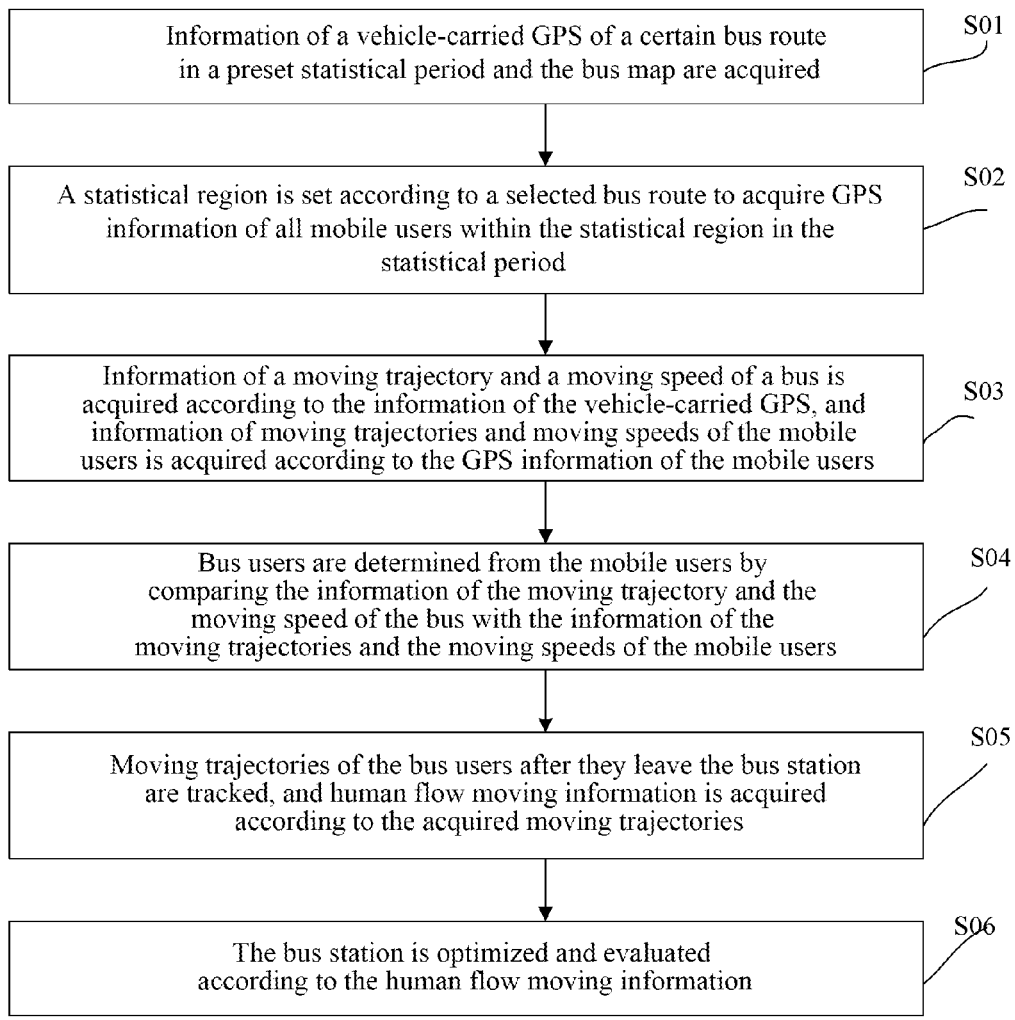
FIG. 1 is a flowchart of a method for optimizing and evaluating a bus station according to embodiment one of the present document.

The embodiment of the present document discloses a method for optimizing and evaluating a bus station, as shown in FIG. 1, comprising the following steps.

In S01, information of a vehicle-carried GPS of a certain bus route in a preset statistical period and the bus map corresponding to the bus route are acquired.

Alternatively, the bus map comprises detailed positions of various bus stations and bus routes.

In S02, a statistical region is set according to a selected bus route to acquire GPS information of all mobile users within the statistical region in the statistical period.

In S03, information of a moving trajectory and a moving speed of a bus is acquired according to the information of the vehicle-carried GPS, and information of moving trajectories and moving speeds of the mobile users is acquired according to the GPS information of the mobile users.

In S04, bus users are determined from the mobile users by comparing the information of the moving trajectory and the moving speed of the bus with the information of the moving trajectories and the moving speeds of the mobile users.

Alternatively, step S04 comprises: when a moving trajectory and a moving speed of a mobile user are consistent with the moving trajectory and the moving speed of the bus, it is determined that the mobile user is on the bus.

In S05, moving trajectories of the bus users after they leave the bus station are tracked, and human flow moving information of the bus station is acquired according to the acquired moving trajectories and the bus map.

Alternatively, step S05 comprises: setting time for tracking the moving trajectories, for example, tracking moving trajectories of the bus users within 5 minutes after they leave the bus station.

Alternatively, step S05 comprises: setting a tracking distance, for example, performing statistics on moving trajectories of the bus users within 1 km after they leave the bus station or the like.

The human flow moving information in step S05 refers to moving information of a human flow formed by multiple bus users within the tracking time or the tracking distance after they leave the bus station, including information such as a human flow moving direction, human flow moving intensity or the like.

In S06, the bus station is optimized and evaluated according to the human flow moving information.

Figure 2:
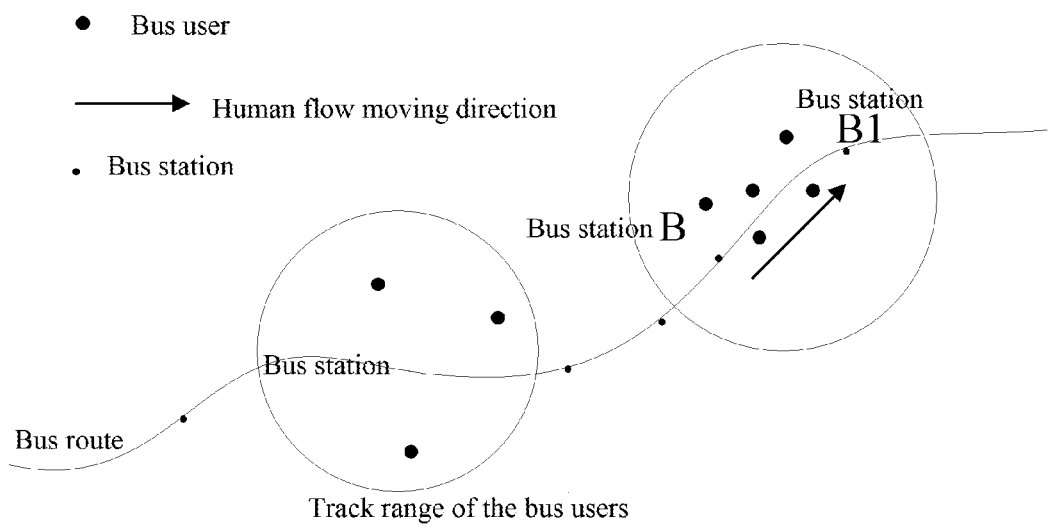
FIG. 2 is a map of a bus route and a bus station according to the embodiment of the present document.

If the information such as a human flow moving direction, human flow moving intensity or the like embodies that the human flow can disperse in time, the station is set correctly (with reference to the station A in FIG. 2).

If the information such as a human flow moving direction, human flow moving intensity or the like embodies that the human flow cannot disperse in time, the station needs to be optimized (with reference to the station B in FIG. 2, and the station B needs to be adjusted to the station B1).

When the station in the figure is optimized, the bus station may also be adjusted in consideration with particular functional places, such as residential areas, airports, docks, markets, office areas, schools, parks or the like.

Embodiment Two

Figure 3:
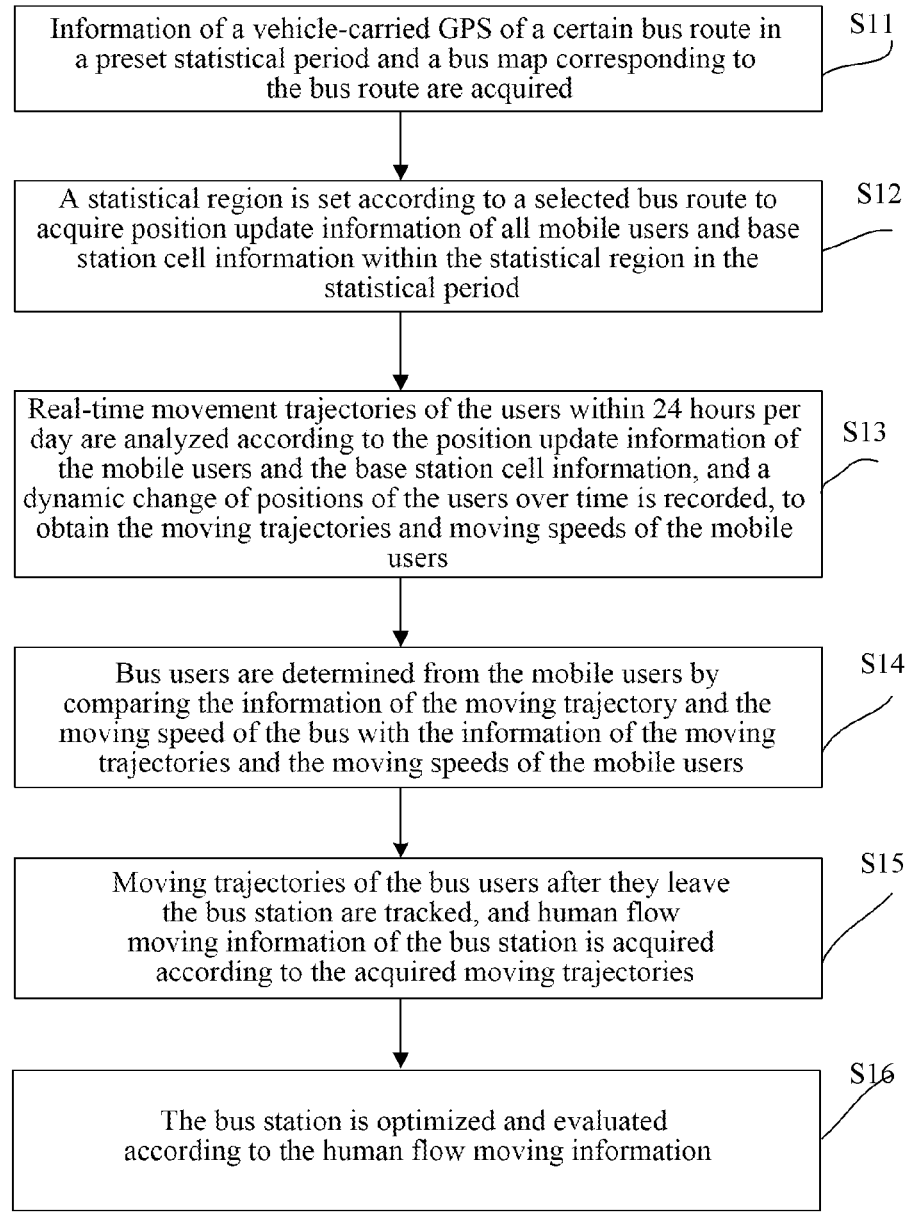
FIG. 3 is a flowchart of a method for optimizing and evaluating a bus station according to embodiment two of the present document.

The embodiment of the present document discloses a method for optimizing and evaluating a bus station. The present embodiment differs from embodiment one in that the information of the moving trajectories and the moving speeds of the mobile users in the present embodiment is acquired through mobile communication signaling information. As shown in FIG. 3, the method comprises the following steps.

In S11, information of a vehicle-carried GPS of a certain bus route in a preset statistical period and a bus map corresponding to the bus route are acquired, and information of a moving trajectory and a moving speed of a bus is acquired according to the information of the vehicle-carried GPS.

Alternatively, the bus map comprises detailed positions of various bus stations and bus routes.

In S12, a statistical region is set according to a selected bus route, to acquire position update information of all mobile users and base station cell information within the statistical region in the statistical period.

The position update information of the mobile users in step S12 may be acquired through the mobile signaling update data at the network side, and comprises phone numbers of the users, position update time and position cell identities; and the base station cell information comprises a cell identity, cell longitude and latitude, a cell radius, a cell administrative address or the like.

In S13, real-time movement trajectories of the users within 24 hours per day are analyzed according to the position update information of the mobile users and the base station cell information, and a dynamic change of positions of the users over time is recorded, to obtain the moving trajectories and moving speeds of the mobile users.

In S14, bus users are determined from the mobile users by comparing the information of the moving trajectory and the moving speed of the bus with the information of the moving trajectories and the moving speeds of the mobile users.

Alternatively, step S14 comprises: when a moving trajectory and a moving speed of a mobile user are consistent with the moving trajectory and the moving speed of the bus, it may be determined that the mobile user is on the bus.

In S15, moving trajectories of the bus users after they leave the bus station are tracked, and human flow moving information of the bus station is acquired according to the acquired moving trajectories and the bus map.

Alternatively, step S05 comprises setting time for tracking the moving trajectories, for example, tracking moving trajectories of the bus users within 5 minutes after they leave the bus station.

Alternatively, step S05 comprises setting a tracking distance, for example, performing statistics on moving trajectories of the bus users within 1 km after they leave the bus station.

The human flow moving information in step S15 refers to moving information of a human flow formed by multiple bus users within the tracking time or the tracking distance after they leave the bus station, including information such as a human flow moving direction, human flow moving intensity or the like.

In S16, the bus station is optimized and evaluated according to the human flow moving information.

If the information such as a human flow moving direction, human flow moving intensity or the like embodies that the human flow can disperse in time, the station is set correctly (with reference to the station A in FIG. 2).

If the information such as a human flow moving direction, human flow moving intensity or the like embodies that the human flow cannot disperse in time, the station needs to be optimized (with reference to the station B in FIG. 2, and the station B needs to be adjusted to the station B1).

When the station in the figure is optimized, the bus station may also be adjusted in consideration with particular functional places, such as residential areas, airports, docks, markets, office areas, schools, parks or the like.

Apparatus Embodiment

Figure 4:
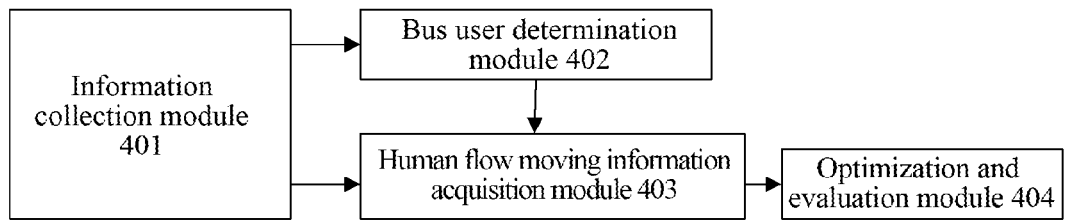
FIG. 4 is a block diagram of a system for optimizing and evaluating a bus station according to embodiment three of the present document.

The embodiment of the present document discloses a system for optimizing and evaluating a bus station. As shown in FIG. 4, the system comprises an information collection module 401, a bus user determination module 402, a dispersion information acquisition module 403, and an optimization and evaluation module 404, wherein, the information collection module 401 is configured to acquire information of a vehicle-carried GPS of a bus route in a preset statistical period and a bus map corresponding to the bus route; set a statistical region according to a selected bus route to acquire GPS information of all mobile users within the statistical region in the statistical period; set a statistical region according to the selected bus route to acquire position update information of all mobile users and base station cell information within the statistical region in the statistical period; acquire information of a moving trajectory and a moving speed of a bus according to the information of the vehicle-carried GPS, and information of moving trajectories and moving speeds of the mobile users according to the GPS information of the mobile users; and analyze real-time movement trajectories of the users within 24 hours per day according to the position update information of the mobile users and the base station cell information, and record a dynamic change of positions of the users over time, to obtain the moving trajectories and moving speeds of the mobile users;

the bus user determination module 402 is configured to determine bus users from mobile users according to the information collected by the information collection module 401 by comparing the information of the moving trajectory and the moving speed of the bus with the information of the moving trajectories and the moving speeds of the mobile users;

the human flow moving information acquisition module 403 is configured to track moving trajectories of the bus users after they leave the bus station, and acquire human flow moving information according to the acquired moving trajectories;

the optimization and evaluation module 404 is configured to optimize and evaluate the bus station according to the human flow moving information.

Alternatively, the bus user determination module 402 is configured to determine that a mobile user is on the bus when a moving trajectory and a moving speed of the mobile user are consistent with the moving trajectory and the moving speed of the bus.

In the above technical solutions, the bus users may also be determined from the mobile terminal users in other manners, which will not be repeated here.

A method for optimizing and evaluating a bus station comprises:

acquiring bus map information and information of moving trajectories of bus users;

acquiring human flow moving trajectory dispersion information of the bus users after they leave a bus station according to the bus map information and the information of the moving trajectories of the bus users; and optimizing and evaluating the bus station according to the human flow moving trajectory dispersion information of the bus users.

Alternatively, before acquiring bus map information and information of moving trajectories of bus users, the method further comprises:

acquiring information of a moving speed and/or trajectory of the bus as well as information of moving speeds and/or trajectories of mobile terminal users; and determining the bus users from the mobile terminal users according to consistency between the information of the moving speed and/or trajectory of the bus and the information of the moving speeds and/or trajectories of the mobile terminal users.

Alternatively, the information of the moving speed and/or trajectory of the bus is acquired through a GPS carried by a bus; and the information of the moving speeds and/or trajectories of the mobile terminal users is acquired through GPSs of mobile terminals or through communication signaling information of the mobile terminals.

Alternatively, acquiring the information of the moving speeds and/or trajectories of the mobile terminal users through communication signaling information of the mobile terminals specifically comprises:

acquiring position update information of the mobile terminal users and base station cell information; and acquiring the information of the moving speeds and/or trajectories of the mobile terminal users according to the position update information of the mobile terminal users and the base station cell information.

Alternatively, the dispersion information comprises consistency information of moving trajectories of a human flow of the bus users within a predetermined period or distance after they leave the bus station.

A system for optimizing and evaluating a bus station comprises:

an information collection module configured to acquire bus map information and information of moving trajectories of bus users;

a dispersion information acquisition module configured to acquire human flow moving trajectory dispersion information of the bus users after they leave a bus station according to the bus map information and the information of the moving trajectories of the bus users; and an optimization and evaluation module configured to optimize and evaluate the bus station according to the human flow moving trajectory dispersion information of the bus users.

Alternatively, the information collection module is further configured to acquire information of a moving speed and/or trajectory of the bus as well as information of moving speeds and/or trajectories of mobile terminal users.

The system further comprises:

a bus user determination module configured to determine the bus users from the mobile terminal users according to consistency between the information of the moving speed and/or trajectory of the bus and the information of the moving speeds and/or trajectories of the mobile terminal users which are collected by the information collection module.

Alternatively, the information of the moving speed and/or trajectory of the bus is acquired through a GPS carried by a bus; and the information of the moving speeds and/or trajectories of the mobile terminal users is acquired through GPSs of mobile terminals or through communication signaling information of the mobile terminals.

Alternatively, acquiring the information of the moving speeds and/or trajectories of the mobile terminal users through communication signaling information of the mobile terminals further comprises:

acquiring position update information of the mobile terminal users and base station cell information; and acquiring the information of the moving speeds and/or trajectories of the mobile terminal users according to the position update information of the mobile terminal users and the base station cell information.

Alternatively, the dispersion information comprises consistency information of moving trajectories of a human flow of the bus users within a predetermined period or distance after they leave the bus station.

The above description is merely preferable embodiments of the present document, instead of limiting the present document. Various changes and variations may be made to the present document by those skilled in the art. Any modification, equivalent substitution, improvement or the like, which is made within the essence and principle of the present document, should be included in the protection scope of the present document.

INDUSTRIAL APPLICABILITY

The above technical solutions can accurately perform statistics on passenger flow data related to a bus station, thereby optimizing and evaluating the bus station. Therefore, the present document has strong industrial applicability.

What is claimed is:

1. A method for optimizing and evaluating a bus station, comprising:

determining bus users from mobile terminal users;

tracking moving trajectories of the bus users after the bus users leaving the bus station, and acquiring human flow moving information of the bus station according to the acquired moving trajectories and a bus map; and optimizing and evaluating the bus station according to the human flow moving information;

wherein the human flow moving information refers to moving information of a human flow formed by multiple bus users within a preset tracking time or a preset tracking distance after the bus users leave the bus station, and the human flow moving information comprises a human flow moving direction and human flow moving intensity, when the human flow moving direction and human flow moving intensity indicates that the human flow disperses in time, the bus station need not to be optimized, when the human flow moving direction and human flow moving intensity indicates that the human flow does not disperse in time, the bus station needs to be optimized.

2. The method according to claim 1, wherein the step of determining bus users from mobile terminal users comprises:

acquiring information of a moving speed and a trajectory of a bus as well as information of moving speeds and trajectories of the mobile terminal users; and determining the bus users from the mobile terminal users by comparing the information of the moving speed and the trajectory of the bus with the information of the moving speeds and the trajectories of the mobile terminal users.

3. The method according to claim 2, wherein, the step of acquiring information of a moving speed and a trajectory of a bus comprises: acquiring the information of the moving speed and the trajectory of the bus through a Global Positioning System (GPS) carried by the bus; and the step of acquiring information of moving speeds and trajectories of the mobile terminal users comprises: acquiring the information of the moving speeds and the trajectories of the mobile terminal users through GPSs of mobile terminals or through communication signaling information of the mobile terminal users.

4. The method according to claim 3, wherein, the step of acquiring the information of the moving speeds and the trajectories of the mobile terminal users through communication signaling information of the mobile terminal users comprises:

acquiring position update information of the mobile terminal users and base station cell information; and acquiring the information of the moving speeds and the trajectories of the mobile terminal users according to the position update information of the mobile terminal users and the base station cell information.

5. A system for optimizing and evaluating a bus station, comprising a bus user determination module, a human flow moving information acquisition module and an optimization and evaluation module, wherein, the bus user determination module is configured to determine bus users from mobile terminal users;

the human flow moving information acquisition module is configured to track moving trajectories of the bus users after the bus users leaving the bus station, and acquiring human flow moving information of the bus station according to the acquired moving trajectories and a bus map; and the optimization and evaluation module is configured to optimize and evaluate the bus station according to the human flow moving information;

wherein the human flow moving information refers to moving information of a human flow formed by multiple bus users within a preset tracking time or a preset tracking distance after the bus users leave the bus station, and the human flow moving information comprises a human flow moving direction and human flow moving intensity, when the human flow moving direction and human flow moving intensity indicates that the human flow disperses in time, the bus station need not to be optimized, when the human flow moving direction and human flow moving intensity indicates that the human flow does not disperse in time, the bus station needs to be optimized.

6. The system according to claim 5, further comprising an information collection module, wherein, the information collection module is configured to acquire information of a moving speed and a trajectory of a bus as well as information of moving speeds and trajectories of the mobile terminal users; and the bus user determination module is configured to determine the bus users from the mobile terminal users by comparing the information of the moving speed and the trajectory of the bus with the information of moving speeds and the trajectories of the mobile terminal users which are collected by the information collection module.

7. The system according to claim 6, wherein the information collection module is configured to acquire information of a moving speed and a trajectory of the bus by means of acquiring the information of the moving speed and the trajectory of the bus through a Global Positioning System (GPS) carried by the bus; and the information collection module is configured to acquire information of moving speeds and trajectories of the mobile terminal users by means of acquiring the information of the moving speeds and the trajectories of the mobile terminal users through GPSs of mobile terminals or through communication signaling information of the mobile terminal users.

8. The system according to claim 7, wherein the information collection module is configured to acquire the information of the moving speeds and the trajectories of the mobile terminal users through communication signaling information of the mobile terminal users by means of:

acquiring position update information of the mobile terminal users and base station cell information; and acquiring the information of the moving speeds and the trajectories of the mobile terminal users according to the position update information of the mobile terminal users and the base station cell information.

* * * * *